No. 691,915. Patented Jan. 28, 1902.
G. R. ROBERTSON.
FASTENING FOR HOOP IRONS WITH WHICH BALES CONTAINING WOOL OR OTHER SOFT PRODUCE ARE SECURED.
(Application filed Mar. 8, 1900.)
(No Model.)
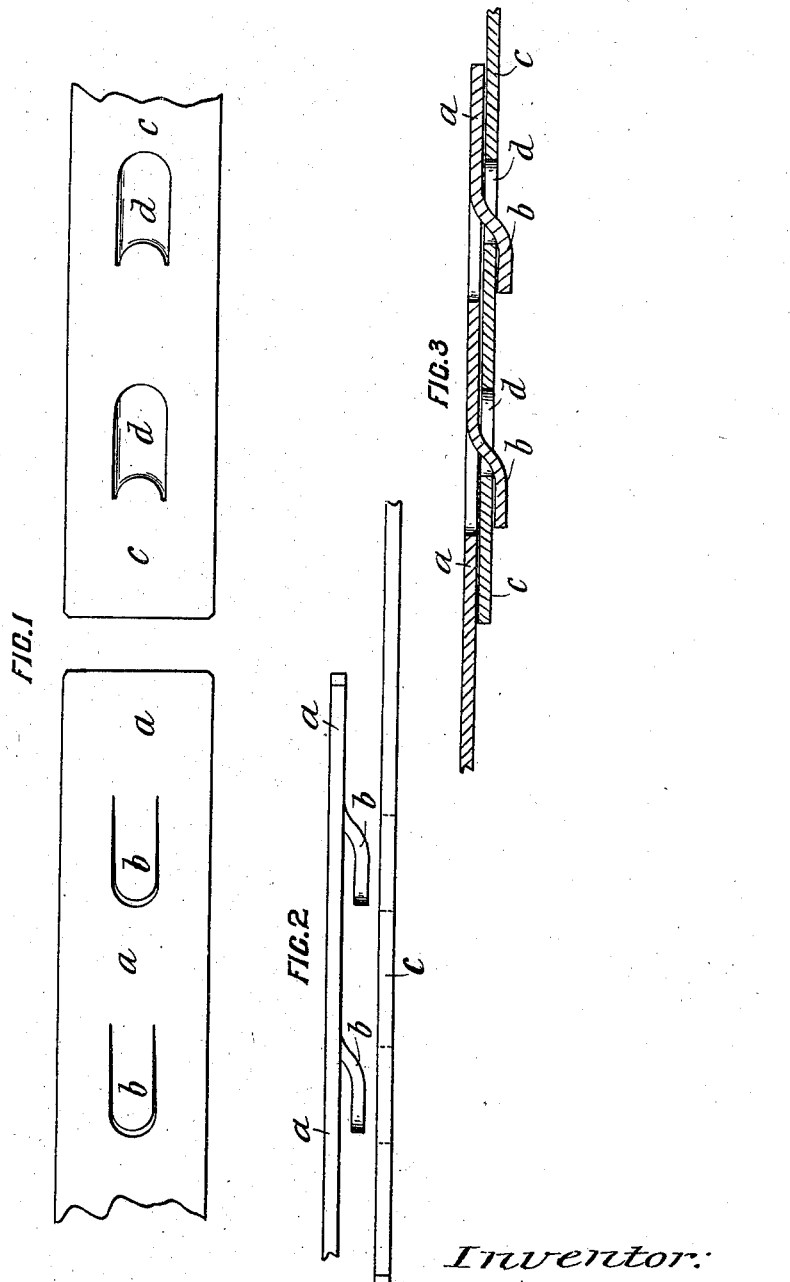
Witnesses:
E. B. Bolton
Inventor:
George Renwick Robertson
By Richards
his Attorneys

UNITED STATES PATENT OFFICE.

GEORGE R. ROBERTSON, OF SYDNEY, NEW SOUTH WALES.

FASTENING FOR HOOP-IRONS WITH WHICH BALES CONTAINING WOOL OR OTHER SOFT PRODUCE ARE SECURED.

SPECIFICATION forming part of Letters Patent No. 691,915, dated January 28, 1902.

Application filed March 8, 1900. Serial No. 7,898. (No model.)

*To all whom it may concern:*

Be it known that I, GEORGE RENWICK ROBERTSON, engineer, a subject of the Queen of Great Britain and Ireland, and a resident of Sydney, in the county of Cumberland and Colony of New South Wales, have invented a certain new and useful Improved Fastening for Hoop-Irons with which Bales Containing Wool or other Soft Produce are Secured, of which the following is a specification.

It has been usual to fasten the ends of the hoop-irons with which wool and other baled produce is secured by means of studs which are loosely fitted to one end of the hoop-iron, such studs securing the hoop-iron on the bale by causing them to enter an aperture or perforation in the opposite end of the hoop-iron. When the bale is relieved from pressure, its contents will expand, and the tensile pressure on the hoop-iron will cause its ends to remain securely fastened together. The appliances at present in use leave much to be desired. They are expensive in themselves, they are a further source of expense when brought into use, and there is always the chance that they may be ineffective to attain the desired end.

My invention has been devised with a view to obviate the disabilities of the present appliances; and it consists in cutting and punching the center of one end of the hoop-iron, so that a tongue shall project from the hoop-iron in such a way that it shall be free to enter a corresponding hole or aperture punched in the opposite end of the hoop-iron.

In order that the invention shall be properly understood, reference will be made to the accompanying sheet of drawings, in which—

Figure 1 is a plan of the two ends of the hoop-iron. Fig. 2 is an edge view of the two ends brought together ready to be secured, and Fig. 3 is a sectional edge view of the same secured together. The dimensions of the last two views have been exaggerated in order to make them more clear.

The part *a* of the hoop-iron is punched in such a way as to form tongues *b*. The opposite end *c* of the hoop-iron is punched so as to make a longitudinal aperture *d*, the ends of the aperture being semicircular, both curves being in the same direction. By this means the convex curve at the base of the aperture will present a larger holding-surface to the tongue when they are connected together, as they will be when the aperture is placed over the tongue, as shown in Fig. 2, and lowered onto it, as shown in Fig. 3, the release of the bale from the dumping pressure causing the two parts thus brought together to bite and hold. The convex end to the slot gives a better hold to the hook than a straight end to the slot would, because there is really more surface for the hook to hold on to, and the substance afforded by the convex end prevents the two parts from being readily disengaged—a very important desideratum in appliances of this nature.

Having now particularly described and ascertained the nature of my said invention and in what manner the same is to be performed, I declare that what I claim is—

The herein-described bale-fastening comprising a metal hoop or strap having openings at one end provided with concave and convex ends, and inwardly-extending tongues upon the opposite end adapted to engage said openings.

In witness whereof I have hereunto set my hand in presence of two witnesses.

GEORGE R. ROBERTSON.

Witnesses:
JAS. T. HUNTER,
R. W. EWERS.